United States Patent [19]

Maier et al.

[11] Patent Number: 4,491,297
[45] Date of Patent: Jan. 1, 1985

[54] THREE WAY COUPLING

[76] Inventors: Peter Maier, Gerokstrasse 1, 7311 Neidlingen, Teck; Dieter Tschacher, Hohenzollernstrasse 4, 7313 Reichenbach, both of Fed. Rep. of Germany

[21] Appl. No.: 385,244

[22] Filed: Jun. 4, 1982

[30] Foreign Application Priority Data

Jun. 6, 1981 [DE] Fed. Rep. of Germany ... 8116897[U]

[51] Int. Cl.³ .......................... F16L 37/28; B24B 5/00
[52] U.S. Cl. ............................ 251/149.1; 51/134.5 F; 51/170 R; 138/113; 138/114; 285/133 R
[58] Field of Search .................. 285/131, 132, 133 R, 285/319, DIG. 14; 173/168, 169; 137/594; 138/113, 114; 251/149, 149.1; 51/134.5 F, 170 R

[56] References Cited

U.S. PATENT DOCUMENTS

| 1,626,277 | 4/1927 | Gardin | 137/594 |
|---|---|---|---|
| 2,584,845 | 2/1952 | Crawley | 285/132 |
| 3,061,930 | 11/1962 | Borden | 138/111 |
| 3,566,915 | 3/1971 | Griffin | 285/133 R |
| 3,673,541 | 6/1972 | Volinskie | 285/319 |
| 3,734,652 | 5/1973 | Barnett | 285/133 R |
| 3,811,514 | 5/1974 | Blomberg et al. | 173/169 |
| 3,964,212 | 7/1976 | Karden | 51/170 T |
| 4,102,083 | 7/1978 | Stern | 51/134.5 F |
| 4,103,936 | 8/1978 | Sutcliffe et al. | 285/131 |
| 4,149,567 | 4/1979 | Weirich | 138/111 |
| 4,302,910 | 12/1981 | Tschacher | 51/170 MT |
| 4,422,239 | 12/1983 | Maier | 51/273 |

Primary Examiner—A. Michael Chambers
Attorney, Agent, or Firm—Flynn, Thiel, Boutell & Tanis

[57] ABSTRACT

An adapter or coupling is joined up with a flexible pipe made up of three pipes nested in each other whose end furthest from the coupling is joined up with an air-powered grinding tool or machine for clearing dust therefrom by aspiration. Furthermore the grinder is joined up by way of the three-part pipe and the coupling with pipes for supplying pressurized air to it and for carrying away such air after undergoing expansion in the motor of the grinder.

The coupling has at one end or side three connection units for joining it up with the three-part pipe and two side unions for the supply of pressurized air and for carrying away such air after expansion. The opposite side of the coupling has further unions for joining it up with a flexible aspiration pipe.

9 Claims, 4 Drawing Figures

THREE WAY COUPLING

FIELD OF THE INVENTION

The present invention relates to a rapid-coupling arrangement for joining up an air-powered machine, from which waste (for example shavings or dust) is cleared by an air current, with an air supply, a waste air connection and an aspirator.

BACKGROUND OF THE INVENTION

Air-powered machines and tools used for machining, and more specially air-powered grinders, have to be supplied with air under pressure for powering them and, after expansion in the motor, the air then has to be piped off to some point clear of the machine while at the same time dirt produced by grinding has to be aspirated. For this purpose, three separate flexible pipe connections are needed and, if such pipes are simply joined together with wires or tapes, they are likely to get in the way of the user of the machine in some way or other.

SUMMARY OF THE INVENTION

To make the handling of such machines or tools simpler, the flexible pipes joining up the machine with the supply and aspirator might be placed within each other, and to make it simpler for the machine to be coupled and uncoupled from the aspirator pipe or waste air pipe, a coupling may be used which, as part of the present invention, is characterized in that on one side (the machine side) it has three rapid-coupling unions nested within each other and having their axes parallel to a common line, two such unions being joined up with elbow connections which are out of line with each other in the axial direction of the coupling, so that a first union having a straight and straight-through adapter duct is in line with the axial direction of the coupling and two further unions joined up with, in each case, one of the elbow connections, are at an angle in relation to the axial direction of the coupling and are spaced from each other.

The coupling of the present invention has one coupling duct with a large cross-section which is used with the aspiration pipe, it being placed running straight through the coupling so as to give good flow properties. On the other hand, the ducts of the coupling which are used for the supply of air and waste air coming from the motor of the tool or machine are joined up with the elbow connections, such an elbow structure with the necessary change in direction of the air current not having any bad effects, because the power air going to the motor and the waste air coming therefrom are free of dust. Because the two connection elbows are at an angle in relation to the axis of the coupling and are spaced axially, the power air pipe and the waste air pipe may be quite simply joined up with the coupling.

Useful, further developments of the invention will be seen in the dependent claims.

As part of one such further development, the middle high speed union is placed coaxially in relation to the innermost high speed union and the two of them are placed eccentrically in relation to the outermost high speed union near a wall thereof, and furthermore the two coaxial high speed unions are joined up with the coupling ducts with the elbow connections. With this further development of the invention a simple way is produced of locking the connection unions against twisting. Moreover, the elbow connections may be made short in length and the coupling may be very simply produced by injection molding.

As part of a still further development of the invention, the middle and innermost high speed unions and the coupling ducts having the elbow connections are provided in an inner part having a radial lip thereon which is gripped between two housing halves of the adapter. This further design of the inventon gives a good effect in connection with producing the coupling by injection molding and more specially with respect to using simple injection molding molds for this purpose.

As part of a still further development of the invention, that is to say a coupling to be used with a hand tool and having rapid coupling unions, use is made of three flexible pipes placed inside the other and forming a united pipe structure whose three pipes are coupled in each case at one end to a union of a coupling body. This coupling body has radial sealing faces for use with radial sealing faces of the rapid coupling unions and there is at last one locking part for use with an opposite locking part on the rapid coupling unions. This form of the invention gives a useful effect as far as the unions may be very simply sealed.

As part of a still further development of the invention the middle flexible pipe is joined to the wall of the outer flexible pipe along a line, this stopping uncontrolled motion or slipping of the different pipes of the three-part pipe in relation to each other while nevertheless keeping the three-part pipe flexible inasfar as the join along a line of the wall of the outer pipe is a neutral plane with respect to flexure of the three-part pipe.

BRIEF DESCRIPTION OF THE DRAWINGS

A detailed account will now be given of one working example of the invention using the figures.

DETAILED DESCRIPTION

Figure 1:
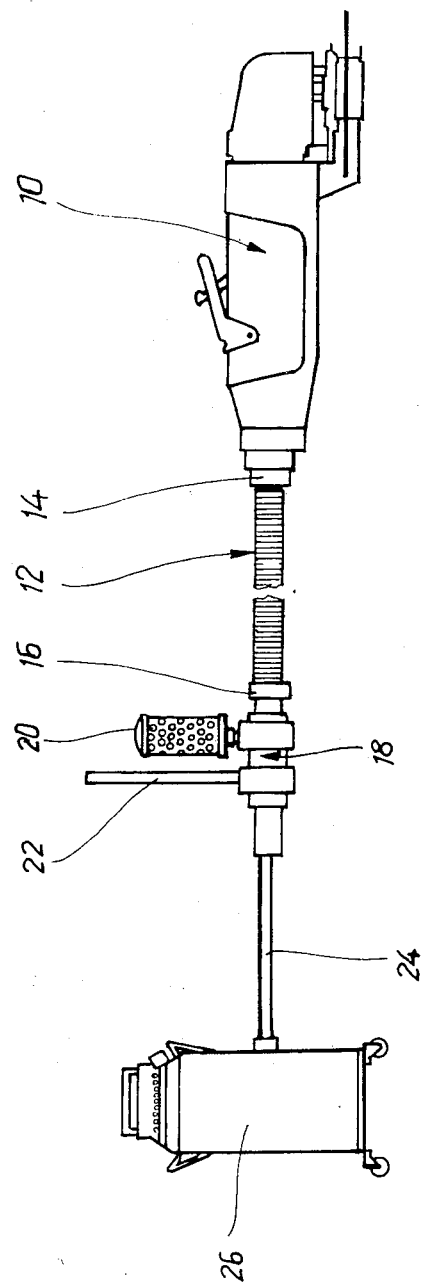
FIG. 1 is a side view of a compressed air angle grinder with parts for supplying air thereto, for handling waste air from the motor of the grinder, and for handing further air for clearing dust from the grinder.

In FIG. 1 the reader will see an air-powered angle grinder 10 having a system for clearing dust by aspiration of air. The supply of air under pressure, the carrying away of compressed air after undergoing expansion in the motor driving the grinder, and the aspiration of dust produced on grinding is undertaken by way of a flexible three-part pipe or hose 12, which is joined up by way of a connection or coupling member 14 with the angle grinder 10 and by way of a connection or coupling member 16 with a coupling or adapter 18.

Coupling 18 has a muffler 20 for letting off and filtering used driving air. The axis of muffler 20 is normal to the axis of the coupling 18, which is in line with the axis of the three-part flexible pipe 12. Furthermore, an input compressed air line 22 is normal to this axis of the coupling and is joined up with the coupling. An output, aspiration pipe 24 will be seen running out from the left hand side of coupling 18 in line with the three-part flexible pipe 12, and running to an aspirator 26.

Figure 2:
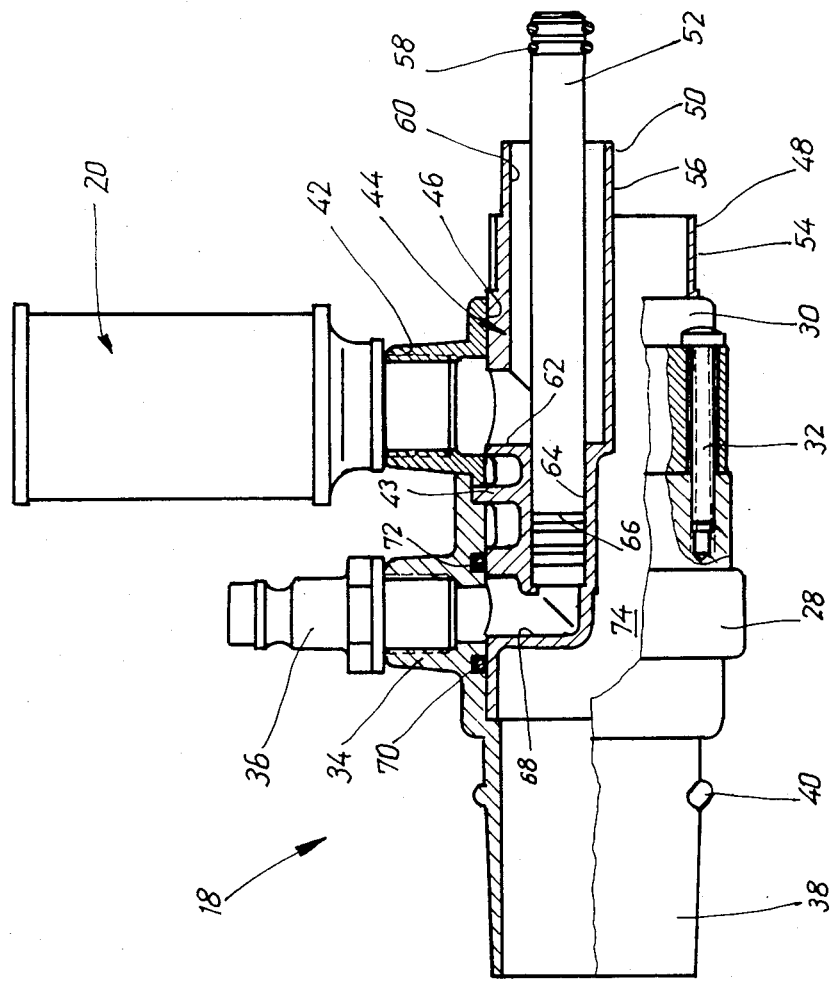
FIG. 2 is a side view, partly in section of an adapter used in the system of FIG. 1.

In FIG. 2 the reader will see details of the coupling 18 or adapter, and more specially that the coupling housing is made up of two parts or halves 28 and 30 joined together by screws 32.

Housing half 28 has a radial compressed air connection union 34 into which a quick-connection or rapid coupling connection piece 36 is screwed. Furthermore housing half 28 has an axial aspiration connection union 38 of greater diameter and whose outer face is somewhat coned and has locking nosepieces 40 for the aspiration pipe 24.

Housing half 30 has a radial used air connection union 42 into which muffler 20 is screwed.

Between the end of housing half 30 to be seen on the left of FIG. 2, (such end part having a decreased diameter) and an adjacent end of housing half 28 there is a lip or flange 43, running radially outwards, and provided on an inner part 44 which has a generally cylindrical outer face. Inner part 44 is held against axial movement by the two housing halves 28 and 30 and is seated with a good mechanical fit in a hole 46 in housing half 30, the inner part 44 furthermore forming on the right hand side of FIG. 2 (nearest the grinder) an outer rapid coupling union 48, a middle rapid coupling union 50 and an inner rapid coupling union 52.

In the present account the wording "rapid coupling union" is used in the sense of a connection union which may be pushed into connection with further union half for automatically forming a sealed connection, for example a connection with play between the unions. To this end the outermost and the middle rapid coupling unions each have an outer face 54 and, in the other case, 56 forming a radial sealing face while on the innermost rapid coupling union 52 there are O-rings 58 for use with a sealing face on the opposite union half used therewith.

As will furthermore be seen from FIG. 2, the innermost and the middle rapid coupling unions are coaxial in relation to each other, the common axis being parallel to, but spaced from the axis of the outermost rapid coupling union 48 in such a way that a line running along and on the outside of the middle rapid coupling union 50 is next to a line running on the outer face of the outermost rapid coupling union 48 in the same axial plane. In other words, the unions 50 and 48 are tangent to each other along an axially extending line of tangency.

A coupling duct or channel 60 may be seen to be running from the middle rapid coupling union 50 in the inner part 44, such coupling duct 60 running through an elbow duct part 62 at an angle of 90° and opening at an outer face of inner part 44 at a position lined up with the union 42.

To the left of union 42 and within inner part 44 there is a hole 64 in which high speed union 52 is fixedly seated and gasketed by O-rings 66, hole 64 forming a duct part 68 with a 90° elbow structure so that the duct or hole 64 comes to an end at the outer face of inner part 44 in line with union 34. O-rings 70 and 72 are used in union 34 for producing a sealing function on the two sides of the inner hole of the coupling housing.

Within the outer wall of inner part 44 there is a third coupling duct 74 running through into union 38 and in line therewith.

Figure 3:
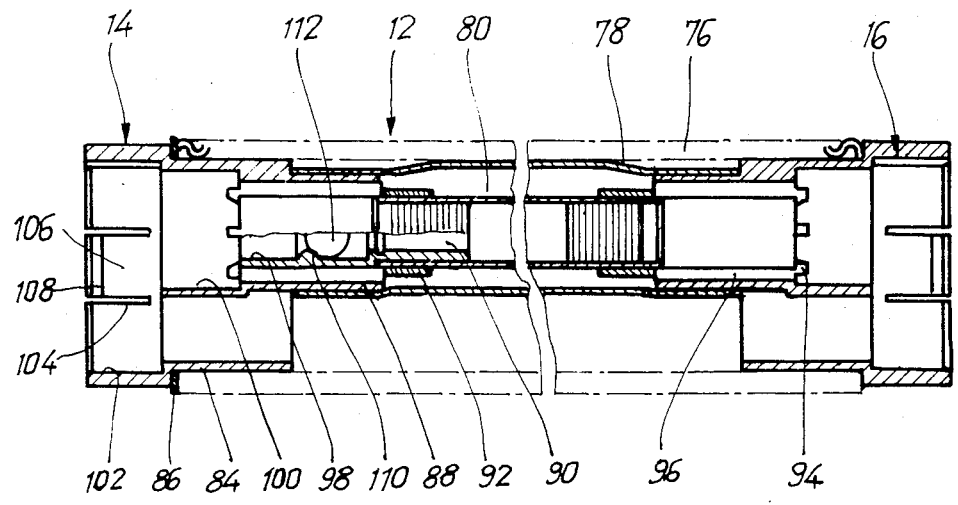
FIG. 3 is an axial section through a three-part flexible hose arrangement which is part of the system of FIG. 1, has pipes are nested inside each other, and is adapted for use between the adapter of FIG. 2 and the angle grinder.
Figure 4:
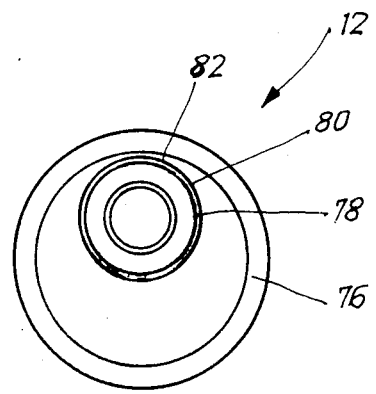
FIG. 4 is a cross-section through the three-part, nested flexible hose arrangement of FIG. 3.

As may be seen from FIGS. 3 and 4, the three-part pipe 12 is made up of an outer flexible, corrugated aspiration flexible pipe 76, a middle used air flexible pipe 78 and an innermost power air flexible pipe 80 which is coaxial with respect to flexible pipe 78. Used air flexible pipe 78 is joined up with aspiration flexible pipe 76 along a line on the outer face of the middle pipe 78 and the inner face of the outermost pipe 76 by a line of adhesive 82.

Because the connections 14 and 16 are of the same design, it is only necessary to give an account of one of them.

The aspiration flexible pipe 76 is fixed on an outer joining skirt 84 of the connection 14 and locked thereon by a circlip 86. Used air flexible pipe 78 is fixed on an eccentric skirt 88 and the power air flexible pipe 80 is fixed on a skirt 90 which is coaxial to the skirt 88, and is fixed on such skirt 90 by way of a clip 92.

Skirt 90 is a separate injection molded part which is kept in place radially and furthermore axially by keeper lips 96 having axially acting nosepieces 94. These lips 96 are spaced out in the round-the-skirt direction and designed running inwards from the inner face of skirt 88 so that there are spaces between the lips for used air. Skirt 88 and furthermore skirt 84 are on the other hand parts of a single injection molded structure.

Connection 14 furthermore has a cylindrical sealing face 98 for use with the O-rings 58, a sealing face 100 for use with the sealing face 50 and making a tight sliding fit thereon, and a sealing face 102 making a tight sliding fit with the sealing face 54 with which it is used.

Connections have narrow cuts 104 for cutting up such connections into springing fingers 106, each such finger having at its free end locking lips 108 designed to be taken up into small hollows (not figured) in the housing of the coupling and at the other end in the angle grinder for locking purposes.

To make it possible for the angle grinder 10 to be undone from the free-part flexible pipe 12 even when the pressure flexible pipe 80 is under pressure, the innermost skirt 90 of connection 14 has on its inner face a ring-like valve seat 110 or shoulder for use with a ball check valve part 112 housed inside skirt 90 and which on joining up the connections 14 and 16, in the one case to the angle grinder 10 and in the other case to the coupling 18, is forced back mechanically by the angle grinder 10 so as to be clear of the valve seat 110.

From the account given it will be quite clear that the angle grinder 10 may be very simply handled without the trailing of the free-part flexible pipe 12 causing any trouble or needing much attention. More specially, the free-part pipe 12 is very unlikely to get itself hooked on a fixed structure in its way. Troublefree and full clearing of the dust produced is made certain, because the aspiration pipe does not have any sharp corners and has the same large cross-section along its full length. Not only the supply of the power air but furthermore the piping away of such air after expansion is at a right angle to the axis of the free-part flexible pipe 12 so that connections may be made quickly. The fact that the used air, coming from the motor of the grinder, is let off at a great distance from the face being worked makes certain that the dust from the grinder is completely cleared from the work space. Furthermore the waste air coming from the angle grinder 10 is kept clear of the worker.

It will be clear that the used air union 42 may be joined up with a used air pipe running to a waste air filter at a still further distance from the coupling.

We claim:

1. An apparatus adapted to be connected to an air-powered, hand-held grinding machine which produces grinding waste for simultaneously creating connections between the grinding machine and a compressed air source which delivers pressurized air to a pneumatic drive mechanism in the grinding machine, between the grinding machine and discharge-air removal means which carries exhaust air from the pneumatic drive mechanism, and between the grinding machine and a suction mechanism for drawing off the grinding waste, comprising an adapter having a housing which, at one end, has annular first, second and third quick-connection parts which are axially parallel and nested, and which respectively communicate with first, second and third channels provided in said adapter housing, said first and second quick-connection parts being the radially inner parts and said first and second channels each having an elbow portion, said elbow portions of said first and second channels being offset in an axial direction with respect to one another and respectively terminating in first and second connection members which project outwardly from said adapter housing transversely with respect to said axial direction, wherein said third channel extends approximately rectilinearly through said adapter housing and terminates in a third connection member which projects in said axial direction from said adapter housing, wherein said first quick-connection part is arranged coaxially within said second quick-connection part and said second quick-connection part is arranged eccentrically in and is near a peripheral wall section of said third quick-connection part; and including a hose arrangement which has first, second and third flexible hoses which are nested and are each coupled at one end to respective fastening connection parts of a coupling member, said fastening connection parts each having a radially facing sealing surface which is adapted to sealingly slidably engage a radially facing sealing surface provided on a respective one of said quick-connection parts when said adapter and said hose arrangement are in an operatively coupled relationship, and said coupling member having locking means which can cooperate with counter-locking means provided on one of said quick-connection parts for releasably maintaining said adapter and said hose arrangement in said operatively coupled relationship.

2. The apparatus according to claim 1, wherein said adapter includes an insert part and said adapter housing includes first and second housing parts, and wherein said first quick-connection part and said first and second channels are provided in said insert part and said insert part has a radial flange which is clamped between said housing parts.

3. The apparatus according to claim 2, wherein said first and second connection members are respectively provided on said first and second housing parts.

4. The apparatus according to claim 1, wherein said first quick-connection part is a pipelike element which is inserted sealingly in a bore which is provided in said adapter housing and serves as said first channel.

5. The apparatus according to claim 1, wherein said third connection member has holding means for releasably holding thereon one end of a suction hose which is adapted to be connected at its other end to the suction mechanism.

6. The apparatus according to claim 1, wherein said second hose is disposed within said third hose and said first hose is disposed within said second hose, and wherein said second hose engages and is connected to said third hose along a longitudinally extending line of tangency therebetween.

7. The apparatus according to claim 1, wherein a first said fastening connection part is connected to said first hose and is supported by angularly spaced holding ribs which are provided in a second said fastening connection part which is connected to said second hose, and wherein said holding ribs have locking noses thereon which cooperate with a front surface of said first fastening connection part.

8. The apparatus according to claim 7, wherein said hose arrangement includes at an end thereof remote from said first-mentioned coupling member a further said coupling member which can be releasably coupled to said grinding machine, an inner surface of said first fastening connection part of said further coupling member having an annular valve seat; including a spherical check-valve member supported in said first fastening connection part of said further coupling member for axial movement between positions spaced from and sealingly engaging said valve seat; and wherein said grinding machine has means for maintaining said check-valve member in a position spaced from said valve seat when said further coupling member is operatively coupled to said grinding machine.

9. The apparatus according to claim 1, including a muffler supported on said adapter and in fluid communication with said second connection member.

* * * * *